Patented Apr. 19, 1949

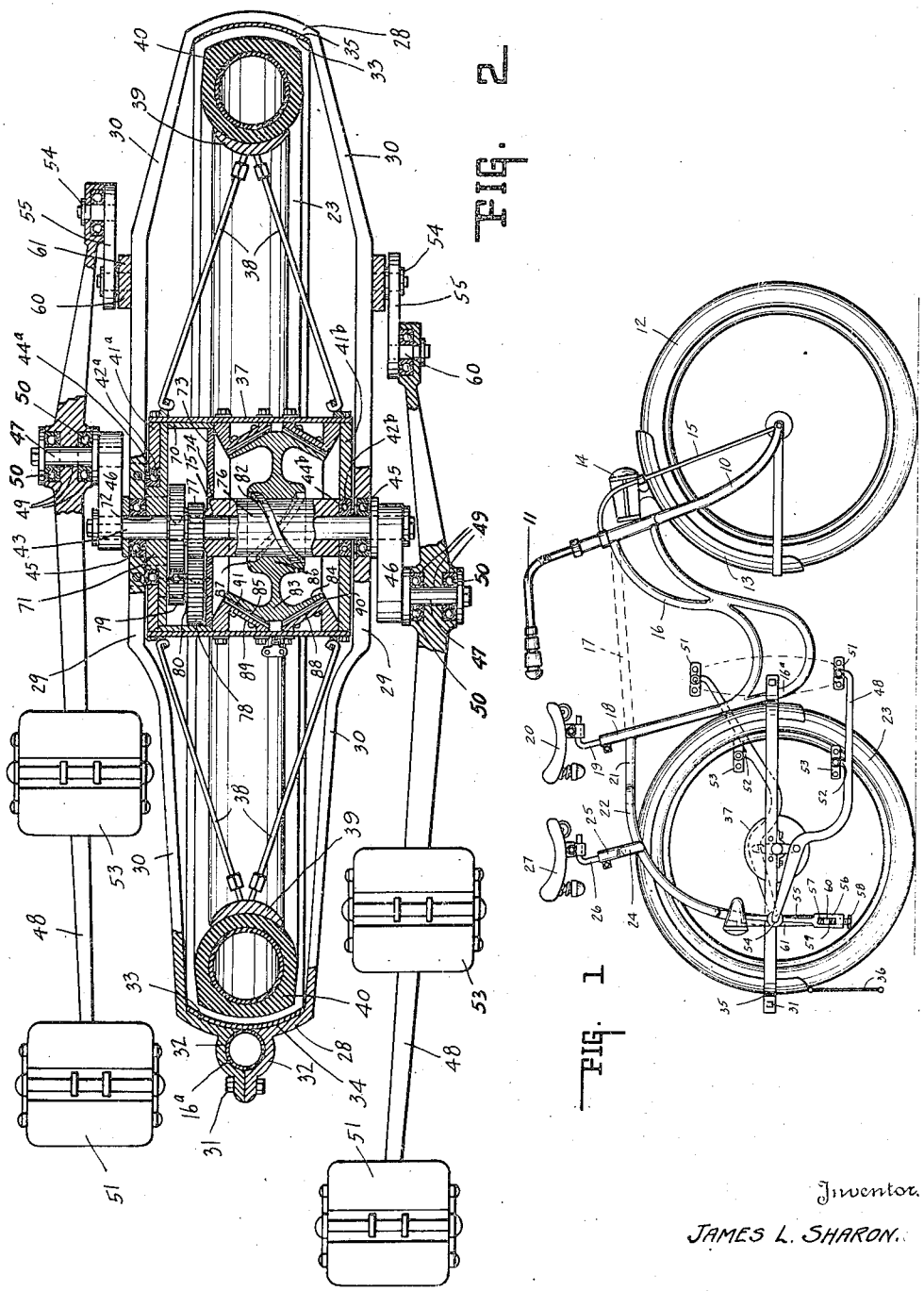

2,467,504

UNITED STATES PATENT OFFICE 2,467,504

REVERSIBLE DRIVE MECHANISM

James L. Sharon, Marion, Ind.

Original application July 9, 1943, Serial No. 494,005. Divided and this application January 3, 1944, Serial No. 516,779

6 Claims. (Cl. 192—3.5)

1

The invention relates particularly to the combination of levers, links, fulcrums and pins, and the transmission means therein arranged, whereby a reciprocating motion, more or less, is converted into a circular motion and applied to the driving wheel or wheels of the vehicle, and improvements therein.

The chief object of the present invention is to provide a simple combination braking and driving structure that can be compactly arranged and which is of reversible character.

The chief feature of the present invention resides in the construction and arrangement of the several parts whereby the aforesaid objective is attained and which parts can be applied axially to a driving wheel, such as the rear wheel of a bicycle.

Other objects and features of the invention will be set forth more fully hereinafter.

This application is a division of the copending application Serial No. 494,005, filed July 9, 1943, now abandoned, and entitled "Cycle power transmission system."

The full nature of the invention will be understood from the accompanying drawings and the following description and claims:

In the drawings,

Fig. 1 is a side elevation of a two-seated bicycle embodiment of the invention, the elliptical-like light dash line representing the foot pedal path.

Fig. 2 is a horizontal central sectional view on a larger scale of the rear wheel and drive mechanism incorporated therein, the pedals, etc., being illustrated in positions approximately midway in the power and pull-up strokes.

In the drawing 10 indicates the front fork of a bicycle frame pivoted in the main frame and mounting handle bars 11, front wheel 12 and mud guard 13. Lamp 14 may be carried by the latter as illustrated, or by the bracing 15 if desired.

The main frame portion 16 may assume any desired conformation, that herein is illustrated being of "lady's" type. Dotted lines 17 indicate the male type. Upwardly directed tubular portion 18 receives the post 19 of a saddle or seat 20. Extending rearwardly from portion 18 is portion 21, which is bifurcated at 22 to straddle the rear wheel 23. Extending upwardly from portions 22 are joined portions 24, which include, if desired, the tubular portion 25 adapted to receive a suitable support for the post 26 of a rear seat 27 in rearward alignment with front seat 20.

In the conventional bicycle the rear wheel axle structure is mounted at opposite ends in the lower rearward ends of the frame. Such, however, is not the case herein for, as shown, there is provided a substantially horizontally disposed closed frame having fore and aft portions 28, parallel side portions 29 and connecting portions 30, see Fig. 2. This closed frame may be made in one piece, or as illustrated in two pieces secured together as at 31 at the front and rear. The rear wheel 23 is horizontally encompassed by said closed frame. The forward portion 28 is provided with a frame seating socket 32 that clampingly receives portion 16a of the main frame. The rear wheel mudguard 33 is secured to the closed frame as at 34 and 35. The rear end may include a drag guard 36 if desired.

The rear wheel 23 includes a relatively large diameter hub 37 in which spokes 38 connect and sustain the rim 39 mounting tire 40. End plates 41a and 41b centrally apertured at 42a and 42b close the hub and from the same projects the main power shaft 43. Ball bearing 44a is mounted in aperture 42a and ball bearing 44b is mounted in aperture 42b.

The main power shaft 43 is ball bearing supported at 45 in the opposite side portions 29 of the closed frame and each projecting shaft end has rigid therewith a crank arm 46, same being oppositely directed or displaced 180°. Each crank arm mounts at its free end an outwardly directed trunnion 47.

A fore and aft directed elongated lever 48 is socketed about one-third forwardly of its rear end as at 49 and in same is mounted the ball bearings 50 and the trunnion 47, same, in effect, constituting an eccentric pin and the lever 48, in effect, constituting a pitman driving member.

Upon the forward end of treadle lever 48 is pivotally mounted pedal 51. About one-third rearwardly thereof, if desired, lever 48 may include an upward extension 52, see Fig. 1, also pivotally mounting a rearward pedal 53. Note that treadle lever 48 is not straight but is somewhat sinuous in side elevation, see Fig. 1.

The rearward end of each treadle lever 48 is pivotally connected at 54 to the upper end of the link rod or member 55. The latter at its lower end is socketed at 56 and therein is slidably mounted a bearing block 57, see Fig. 1, the position of which is adjusted by member 58. Each block is apertured at 59 to pivotally mount pivot pin 60. This is an adjustable pivot and fulcrum arrangement.

Each pivot 60 is rigid with portion 61, same constituting a downwardly directed extension of a furcation portion 22 of the main frame. If desired, portion 61 may be rigidly secured to the closed frame as well, for then it serves to rigidize the latter with the main frame by a three point connection.

Note that the adjustment herein is not made between pin 60 and portion 61, but between bearing block 57 and link 55. This, in effect, is a means for adjusting the effective length of said link as desired or required.

The operation of the mechanism, so far described, is as follows: Treadle levers 48 each are alternately depressed and elevated, one depressing while the other is elevating. Such movement causes rotation of power shaft 43 in a direction to assure forward driving of the rear wheel 23. Observe that as lever 48 lowers and raises, the link 55 oscillates to and fro, the throw of crank pin 46 determining the amplitude of same. However, note the total angular displacement of rod 55 varies with the adjusted length thereof, the greater length providing lesser angular displacement and vice versa.

It is quite clear that since, if pivot 54 is not a fixed center pivot and fulcrum for lever 48, the path of each pedal does not follow a circle, but the path is elliptical-like, and by the adjustment at 58 the character of this path may be determined. Herein, as initially set forth, the down stroke is at least 180° in length and the up stroke slightly less. The elliptical path has a major axis approximately four to five times the minor axis thereof.

Reference now will be had to Fig. 2 wherein the connection between main drive shaft 43 and hub 37 is illustrated. Within the hub 37 is a housing 70 having a boss 71 rotatably supporting shaft 43 at 72. A plate 73 closes the housing and same is centrally apertured at 74 to support the end 75 of sleeve or driving hub 76 upon which is rigidly mounted pinion 77 meshing with gear 78 rigid with pinion 79, both being mounted on shaft 80, the ends of which are mounted in housing 70 and plate 73. Pinion 79 meshes with gear 81 rigid with shaft 43 that extends through the housing, hub and sleeve. Note, whenever and wherever desired, pins and gears, where shown keyed to shafts, etc., may, if desired, be formed integral therewith, provided assembly interference does not prevent same. The foregoing gear train, accordingly, secures rapid rotation of sleeve 76 for comparatively slow rotation of shaft 43 by the treadle levers 48.

Formed upon the surface of sleeve 76 is a continuous worm 82. 83 indicates an oppositely tapered driving cone drum having opposed faces 84 and 85. This drum has hub 86 with a worm groove 87 therein to seat worm 82. This drum has sufficient clearance at either side to allow motion axial thereof for selective association of faces 84 or 85 with the generally complementary enveloping faces 88 or 89, respectively, each being suitably lined as at 90 or 91, respectively. Fig. 2 shows the parts in neutral position. The gear train has a one to four ratio drive.

Upon actuation, pumping, of treadles 48, the rotation of sleeve 76 is in the same direction as shaft 43 and four times as fast. This rotation through the worm and groove drive causes the hub 86 to move (upwardly in Fig. 2) so that cone 85 engages frictionally and locks to the required degree to face 89 (actually lining 91) for forward rotation of the rear wheel 23.

Axial movement of hub 86 from the intermediate (neutral) position to driving or braking position is effected as follows: Hub 86 and drum 83 have mass; therefore if the same is rotating and the sleeve 76 is rotated faster, the screw action effects axial movement of the hub and drum in one direction. Similarly if sleeve 76 is slowed down the screw action is in the reverse direction and hub 86 and drum 83 moves axially in the reverse direction to the former axial movement. The large lead angle facilitates such operation.

With the slowing down of the rotation of drive shaft 43 relative to wheel rotation, the worm and groove connection will disengage the aforesaid driving connection and power drive ceases.

If the pedals are rotated still slower or stopped and reversed sufficiently, the worm and groove connection will shift face 84 into engagement with drum 88 (actually lining 90 therein) thereby retarding the rate of rotation of the rear wheel 23. Sufficient effort in the reverse direction by the rider will bring the wheel to a dead stop, a gradual stop, or as severe a stop as may be desired or required.

The foregoing structure is therefore flexible because for one thing it includes a friction engagement and also it is so constructed that it can, in effect, provide for free wheeling in coasting and braking in any emergency. The only wearable parts requiring replacement in this drive unit, accordingly, are the bands or lining members 90 and 91.

The gear case, see housing 70 and cover 73, is fully enclosed within the wheel hub structure and is only exposed where it is brought out therefrom so that the gear case may be held against rotation in the wheel hub while permitting the wheel hub to rotate. Where so exposed, lubricant supply fittings may be provided to maintain lubricant in said case. Such gear case holding means may partake of any conventional character since a portion thereof is disposed in contact with frame 29.

It will be obvious, see Fig. 2, that the parts are assembled in the rear wheel hub from the one side only and plate 41b is last applied to said hub 37. Any desired seal may be provided between the housing and cover to prevent lubricant escape internally and thus damage the several linings.

The aforesaid complete driving mechanism with included rear wheel 23, it will be observed, is readily detachable from and attachable to the main frame. No chains or sprockets are required. No special coaster brake is required. No gears are exposed and all parts are streamlined so that soiling or injury to the garments of the rider or riders does not occur, nor does injury to the latter appear probable in the use of a bicycle incorporating this invention.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. A power transmitting drive including a hub having an internal first face and a second internal face, a single member selectively engageable therewith or neutrally positionable therebetween, a sleeve within the member, a worm and groove type drive connection between the member and sleeve for axially shifting said member into selected face engaging position or neutral position, a power shaft in said sleeve, a gear train between said shaft and sleeve, and a casing enclosing the gear train, and coaxial with and within the hub and having a portion exposed thereby for case lubricant supply purpose, said casing preventing lubricant access to the said faces.

2. A drive as defined by claim 1 wherein the shaft projects at opposite ends from said hub and each projecting shaft end supports a crank portion, an elongated treadle lever for each crank portion and pivotally connected thereto intermediate the ends of said lever, foot engageable means on said treadle lever remote from the crank connection, and a link pivotally connected to said treadle lever upon the side opposite the foot engageable means, said link being pivotally mounted.

3. A power transmitting shaft including in combination a power shaft, wheel means with a hub formation having an internal conical face and a similar but oppositely directed face spaced therefrom, the two faces confronting each other, a power transmitting control member within the hub formation and having oppositely directed complementary face engaging portions suitably spaced apart for selective engagement with or non-engagement from the faces as desired, a multiple thread connection between said shaft and the control member for insuring such engagement by axial shifting of the control member, said control member being power shaft driven, the wheel hub formation encompassing said faces and the control member, the shaft projecting through said formation at opposite sides, and crank portions being provided adjacent the sides of said hub formation and on opposite ends of the shaft.

4. A power transmitting device as defined by claim 3 wherein there is a gear train interposed between said shaft and said connection.

5. A power transmitting device as defined by claim 4 wherein the multiple thread connection includes a worm and groove formation, the gear train being included within the wheel means hub formation.

6. A power transmitting device as defined by claim 5 wherein the pitch of the worm and groove formation is greater than the worm diameter.

JAMES L. SHARON.

REFERENCES CITED

The following references are of record in the file of this patent:

UNITED STATES PATENTS

| Number | Name | Date |
|---|---|---|
| 849,474 | Hegeland | Apr. 9, 1907 |
| 962,252 | Rockwell | June 21, 1910 |
| 1,089,483 | Laffond | Mar. 10, 1914 |
| 1,117,975 | Carter | Nov. 24, 1914 |
| 1,254,180 | Ward | Jan. 22, 1918 |
| 1,393,693 | Otti | Oct. 11, 1921 |
| 1,441,418 | Halbleib | Jan. 9, 1923 |
| 1,991,756 | Lazich | Feb. 19, 1935 |
| 2,246,191 | Schmitz | June 17, 1941 |

FOREIGN PATENTS

| Number | Country | Date |
|---|---|---|
| 10,496 | Great Britain | 1906 |
| 14,672 | Great Britain | 1908 |